United States Patent
Boates et al.

(10) Patent No.: US 10,062,078 B1
(45) Date of Patent: Aug. 28, 2018

(54) FRAUD DETECTION AND TRANSACTION REVIEW

(71) Applicant: Square, Inc., San Francisco, CA (US)

(72) Inventors: Brian Boates, San Francisco, CA (US); Rensheng Zhou, San Francisco, CA (US); Melissa Dalis, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 254 days.

(21) Appl. No.: 15/181,962

(22) Filed: Jun. 14, 2016

(51) Int. Cl.
| | |
|---|---|
| G06F 11/00 | (2006.01) |
| G06Q 20/00 | (2012.01) |
| G06Q 20/40 | (2012.01) |
| G06Q 20/10 | (2012.01) |
| G06Q 20/20 | (2012.01) |

(52) U.S. Cl.
CPC ......... *G06Q 20/4016* (2013.01); *G06Q 20/10* (2013.01); *G06Q 20/209* (2013.01); *G06Q 20/407* (2013.01)

(58) Field of Classification Search
CPC ........ G06F 21/52; G06F 21/55; G06F 21/551; G06F 21/552; G06F 21/557; G06F 2221/034; G06F 17/30528; G06F 17/30371; G06F 17/30466; G06Q 10/10; G06Q 20/04; G06Q 20/10; G06Q 20/40; G06Q 20/204; G06Q 20/325; G06Q 20/353; G06Q 40/00; G06Q 40/02; G06Q 40/12; G06Q 40/025; H04L 63/1416; H04L 29/06911; H04L 29/06925; H04L 29/06931; H04L 29/06938; G06N 99/005

USPC ...... 235/376–380; 385/100; 370/220; 705/1, 705/7.29, 26.1, 35, 38, 44; 706/12, 20; 707/690; 709/204, 217–225; 726/1, 23
See application file for complete search history.

(56) References Cited

U.S. PATENT DOCUMENTS

| | | | | |
|---|---|---|---|---|
| 5,819,226 A | * | 10/1998 | Gopinathan | ........... G06Q 20/00 705/44 |
| 6,330,546 B1 | * | 12/2001 | Gopinathan | ........... G06Q 20/00 705/35 |
| 7,297,723 B2 | * | 11/2007 | Wilke | ................ C08G 18/0866 427/407.1 |

(Continued)

OTHER PUBLICATIONS

Breiman, "Random Forests", University of California, Berkeley, CA, Jan. 2001, 33 pages.

(Continued)

*Primary Examiner* — Andrew Joseph Rudy
(74) *Attorney, Agent, or Firm* — Lee & Hayes, PLLC

(57) ABSTRACT

An automated purchase transaction service implements a two-phase analysis to identify suspect transactions and to freeze merchant accounts associated with certain of the suspect transactions. In a first analysis phase, a transaction is analyzed using a first predictive model to determine a probability that the transaction is fraudulent. If the probability exceeds a first threshold, the transaction is further analyzed in a second phase. In the second analysis phase, the transaction is analyzed using a second predictive model to determine a probability that manual review by a human analyst will result in freezing the associated account. If the probability exceeds a second threshold, the transaction is automatically frozen. If the probability does not exceed the second threshold, the transaction is submitted to a human analyst for manual review.

20 Claims, 10 Drawing Sheets

(56) References Cited

U.S. PATENT DOCUMENTS

| | | | | |
|---|---|---|---|---|
| 7,578,438 B2* | 8/2009 | Hogg | G06Q 20/04 235/380 |
| 7,596,260 B2* | 9/2009 | Tedesco | G06F 17/30256 348/143 |
| 7,668,769 B2* | 2/2010 | Baker | G06Q 10/067 705/35 |
| 7,788,195 B1* | 8/2010 | Subramanian | G06N 99/005 706/20 |
| 7,792,405 B2* | 9/2010 | Stoesz | G02B 6/02209 385/100 |
| 7,912,773 B1* | 3/2011 | Subramanian | G06Q 10/04 705/35 |
| 7,970,701 B2* | 6/2011 | Lewis | G06Q 10/0635 705/35 |
| 8,005,737 B2* | 8/2011 | Hammad | G06Q 20/04 705/35 |
| 8,224,723 B2* | 7/2012 | Bosch | G06Q 20/108 705/35 |
| 8,417,650 B2* | 4/2013 | Graepel | G06N 7/005 706/12 |
| 8,676,726 B2* | 3/2014 | Hore | G06N 99/005 706/12 |
| 8,885,894 B2* | 11/2014 | Rowen | G06K 9/00187 382/119 |
| 9,384,493 B2* | 7/2016 | Harris | G06Q 30/0201 |
| 9,454,733 B1* | 9/2016 | Purpura | G06N 99/005 |
| 9,508,075 B2* | 11/2016 | Geckle | G06Q 40/02 |
| 9,524,501 B2* | 12/2016 | Weber | G06Q 20/38 |
| 9,607,336 B1* | 3/2017 | Dean | G06Q 40/025 |
| 9,773,227 B2* | 9/2017 | Zoldi | G06Q 10/10 |
| 9,842,175 B2* | 12/2017 | Steinberg | G06F 17/30961 |
| 9,852,427 B2* | 12/2017 | Caldera | G06Q 20/4016 |
| 9,888,007 B2* | 2/2018 | Caldera | H04L 63/10 |
| 9,892,465 B2* | 2/2018 | Love | G06Q 40/12 |
| 9,898,509 B2* | 2/2018 | Saperstein | G06F 17/30528 |
| 9,906,402 B2* | 2/2018 | Ramachandran | H04L 41/0668 |
| 9,910,980 B2* | 3/2018 | Kolacinski | G06F 21/52 |
| 9,911,110 B2* | 3/2018 | Scott | G06Q 20/204 |
| 2006/0059073 A1* | 3/2006 | Walzak | G06Q 40/00 705/35 |

OTHER PUBLICATIONS sklearn.ensemble.RandomForestClassifier 3.2.4.3.1, retrieved on Mar. 14, 2016 at <<http://scikit-learn.org/stable/modules/generated/sklearn.ensemble.RandomForestClassifer . . . >>, 11 pages.

* cited by examiner

FRAUD DETECTION AND TRANSACTION REVIEW

BACKGROUND

A merchant may utilize the services of an online transaction processing service for conducting purchase transactions with customers and for processing payments by customers. The transaction processing service may provide services for a large number of merchants, and may include pricing services, inventory services, payroll services, and other integrated services.

In some situations, merchants or other parties may submit fraudulent transactions to the transaction processing service, for which the transaction processing service may eventually become liable by a mechanism known as chargeback. The transaction processing service may take measures to detect fraudulent transactions and to disable accounts associated with parties that are attempting to conduct fraudulent transactions.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
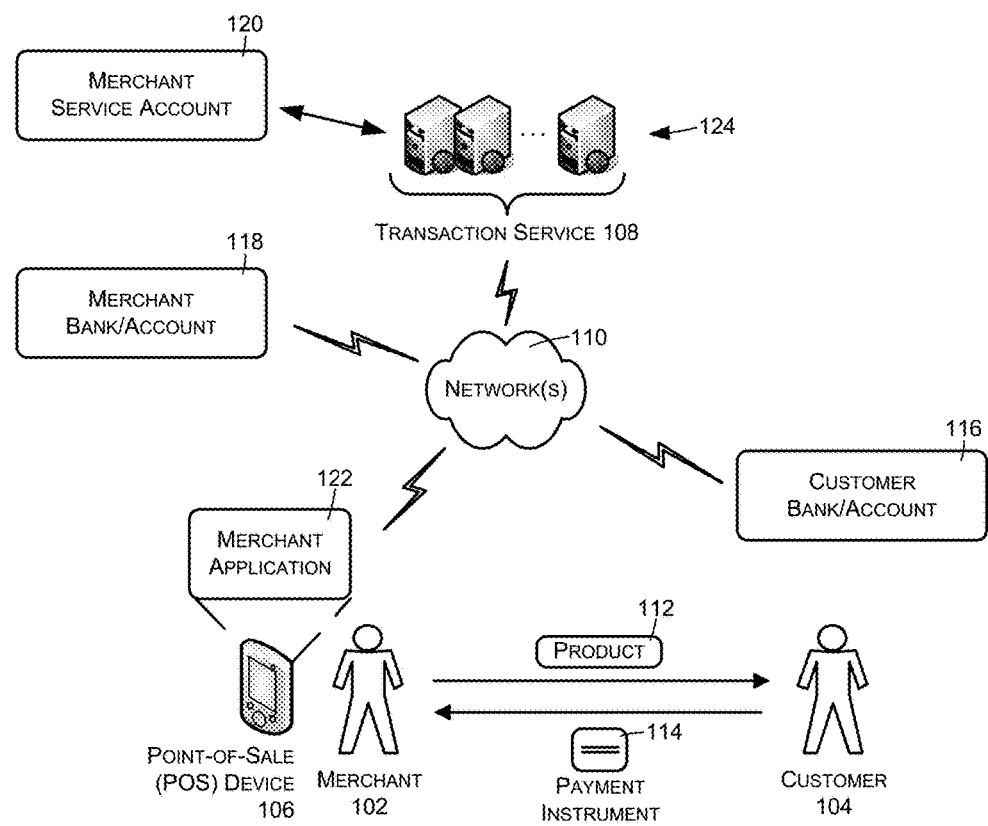
FIG. 1 is a block diagram of an example payment system that implements techniques for detecting and reviewing suspected purchase transactions.

An automated transaction processing service may be implemented using procedures and analytical steps to detect attempted fraudulent transactions and to restrict the accounts of parties that attempt such fraudulent transactions.

In accordance with embodiments described herein, machine learning techniques are used to construct predictive models that may be used to analyze transaction data in order to produce probabilities regarding fraud. The predictive models are then used in a two-phase analysis in which certain transactions are allowed to proceed, certain transactions are submitted for analysis by human analysts to determine whether to freeze the associated accounts, and certain transactions are automatically frozen without human analysis.

A first analysis phase uses a first predictive model that is constructed to model the probability of any given transaction being fraudulent. This probability, referred to herein as a fraud probability, is compared to a fraud probability threshold. If the fraud probability is less than the fraud probability threshold, the transaction is allowed to proceed without further analysis. If the fraud probability exceeds the fraud probability threshold, the transaction is submitted to a second analysis phase. In some cases, the fraud probability may be compared to a second, relatively higher fraud probability threshold, and if the fraud probability exceeds the higher threshold the account associated with the transaction is automatically frozen, without further analysis.

The second analysis phase uses a second predictive model that is constructed to model the probability that a human analyst, upon analyzing a given transaction, will freeze the account associated with the transaction. This probability, referred to herein as a freeze probability, is compared to a freeze probability threshold. If the freeze probability is greater than the freeze probability threshold, the account associated with the transaction is automatically frozen, without human analysis. Otherwise, if the freeze probability is less than the freeze probability threshold, the transaction is submitted to a human analyst for a determination regarding whether to freeze the associated account.

In either or both of the first and second phases, there may be a range of probabilities near or around the corresponding probability threshold that are probabilistically sampled to determine the outcome of the analysis phase. In the first phase, for example, a sampling of transactions may be submitted to the second stage and/or to human analysts, even when the transactions have fraud probabilities that are below the fraud probability threshold. In the second phase, a sampling of transactions may be submitted to human analysts even when the transactions have freeze probabilities that exceed the freeze probability threshold.

When initially introducing a new probability model into a process such as described above, a rollout and tuning process may be used to achieve desired results. In the examples described, a rollout and tuning process is used to achieve a desired review freeze rate, wherein the review freeze rate indicates the rate at which human analysts freeze accounts associated with manually reviewed transactions.

In accordance with embodiments described herein, a target review freeze rate is selected based on economic considerations such as a comparison of manual review costs versus the savings from fraud loss reductions. For example, a relatively low review freeze rate may indicate a relatively low return on the investment being made in reviewing the transactions, while a relatively high review freeze rate may mean that there are significant numbers of fraudulent transactions that are not being detected. The target review freeze rate may also be selected based on engagement considerations related to human analyst engagement and work satisfaction. For example, human analysts may demonstrate greater engagement and find more satisfaction at an observed review freeze rate of 50%, rather than either 5% or 95%, because of that observed review freeze rate's higher per-transaction unpredictability). The first-phase fraud probability threshold is then varied to achieve the target review freeze rate.

Initially, the first-phase fraud probability threshold is set to a relatively high value, resulting in a relatively low number of transactions being submitted for human review. Because these transactions have relatively high fraud probabilities, the resulting review freeze rate is likely to also be relatively high.

After a period of time, such as a day or a number of days, the observed review freeze rate is compared to the target review freeze rate. If the observed review freeze rate is higher than the target review freeze rate, the first-phase fraud probability threshold is adjusted downwardly by a predetermined step size. If the observed review freeze rate is lower than the target review freeze rate, the first-phase fraud probability threshold is adjusted upwardly by the predetermined step size. An adjustment such as this is repeated periodically, so that the observed review freeze rate eventually converges to or near the target review freeze rate.

FIG. 1 illustrates an example system 100 that conducts and/or facilitates purchase transactions between merchants and customers. For purposes of discussion, FIG. 1 shows a single merchant 102 and a single customer 104. The merchant 102 has an associated point-of-sale (POS) device 106 that is supported by an online transaction service 108, which is also referred to herein as a transaction service. The POS device 106 communicates with the transaction service 108 through a wide-area network (WAN) 110, such as the public Internet, using secure communication protocols. The transaction service 108 processes purchase transactions on behalf of the merchant 102. In practice, the transaction service 108 may process purchase transactions on behalf of multiple merchants 102.

The merchant 102 and the customer 104 interact with each other to complete a purchase transaction in which the customer 104 acquires a product 112 from the merchant 102, and in return, the customer 104 provides payment to the merchant 102. The term "transaction" includes any interaction for the acquisition of a product in exchange for payment. The term "product" is understood to include goods and/or services. The term "customer" includes any entity that acquires products from a merchant, such as by purchasing, renting, leasing, borrowing, licensing, or the like. The term "merchant" includes any business engaged in the offering of products for acquisition by customers. Actions attributed to a merchant may include actions performed by owners, employees, or other agents of the merchant.

The customer 104 may provide payment using cash or another payment instrument 114 such as a debit card, a credit card, a stored-value or gift card, a check, etc. Payment may also be made through an electronic payment application on a customer mobile device, such as a smartphone carried by the customer 104.

When the customer 104 and the merchant 102 enter into an electronic purchase transaction, the merchant 102 interacts with the POS device 106 to provide payment information and to identify products that are being purchased. The merchant may input (e.g., manually, via a magnetic card reader or an RFID reader, etc.) a credit card number or other identifier of the payment instrument 114. For example, the payment instrument 114 may include one or more magnetic strips for providing card and customer information when swiped in a card reader associated with the POS device 106. In other examples, other types of payment instruments may be used, such as smart cards having built-in memory chips that are read by the POS device 106 when the cards are "dipped" into the reader, smart cards having radio frequency identification devices (RFIDs), and so forth.

Purchase transaction information may include an identifier of the payment instrument (such as a credit card number and associated validation information); an identification of a card network associated with the payment instrument; an identification of an issuing bank of the payment instrument; an identification of a customer with whom the purchase transaction is being conducted; a total amount of the purchase transaction; the products acquired by the customer in the purchase transaction; the purchase prices of the individual products; the time, place, time, and date of the purchase transaction; the product category of each purchased product; and so forth. The POS device 106 sends such transaction information to the transaction service 108 over the network 110, either contemporaneously with the conducting of the transaction (in the case of online transactions) or later when the POS device 106 is online.

In response to receiving the transaction information, the transaction service 108 processes the corresponding purchase transaction by electronically transferring funds from a financial account 116 associated with the customer 104 to a financial account 118 associated with the merchant 102. The transaction service 108 may communicate with one or more computing devices of a card network (or "card payment network"), e.g., MasterCard®, VISA®, over the network 110 to conduct financial transactions electronically. The transaction service 108 can also communicate with one or more computing devices of one or more banks, processing/acquiring services, or the like over the network 110. For example, the transaction service 108 may communicate with an acquiring bank, and/or an issuing bank, and/or a bank maintaining customer accounts for electronic payments.

The merchant 102 maintains a service account 120 with the transaction service 108 in order to subscribe to services provided by the transaction service 108. In practice, the transaction service 108 maintains multiple merchant service accounts 120. Each transaction request is associated with an account, which is typically the service account of the merchant that that is attempting to complete the purchase transaction and that has submitted the transaction request. Upon receiving a transaction request, the transaction service 108 refers to information indicated by the associated merchant service account 120 in order to determine the types of services and the configuration of services to be provided to the requesting merchant 102.

The merchant service account 120 may contain or may reference various data associated with or relating to the merchant, such as data regarding historical transactions, account balances, configuration information, bank account information, address information, and so forth. The merchant service account 120 may also indicate various status information regarding a merchant and the merchant's account with the transaction service 108, such as whether the account is in good standing, and/or whether the account has been frozen, such as by being disabled or restricted.

The POS device 106 may comprise any sort of mobile or non-mobile computer device, such as a tablet computer, smartphone, personal computer, laptop computer, etc. A merchant application 122 executes on the POS device 106 to provide POS functionality to the POS device 106.

In some types of businesses, the POS device 106 may be located in a store or other place of business of the merchant 102, and thus may be at a fixed location that does not change on a day-to-day basis. In other types of businesses, however, the location of the POS device 106 may change from time to time, such as in the case that a merchant operates a food truck, is a street vendor, is a cab driver, etc., or has an otherwise mobile business, e.g., in the case of merchants who sell products at buyer's homes, places of business, and so forth.

The transaction service 108 may be implemented by one or more server computers 124 and associated software components that provide the functionality described herein.

As will be described in more detail below, the transaction service 108 employs measures to detect and prevent fraudulent transaction charges. Fraudulent charges may be due to deliberate merchant schemes and/or by customer actions. In some cases, in response to detecting or suspecting fraud, the transaction service 108 may disable or otherwise restrict the service account 120 of the merchant 102, meaning that some or all of current and future transaction requests from the merchant 102 will be refused and that requested funds transfers will not be completed. In some environments, disabling or restricting the merchant's account 120 may be referred to as "freezing" the merchant account. More generally, the term "freeze" may be used to indicate different degrees of restrictions that may be placed on transactional activities of a merchant with respect to the transaction service 108.

Once a merchant or merchant service account is frozen, the merchant may be able to unfreeze the service account by providing information to the transaction service 108 or by otherwise interacting with the transaction service 108 to verify that the past and ongoing transactions requested by the merchant are in fact non-fraudulent.

Note that although the term "transaction" has been described above as pertaining to purchases and purchase payments, a transaction may also comprise other types of events, such as account activations, asset connections (such as linking banking accounts to a merchant account), account logins, and so forth.

Figure 2:
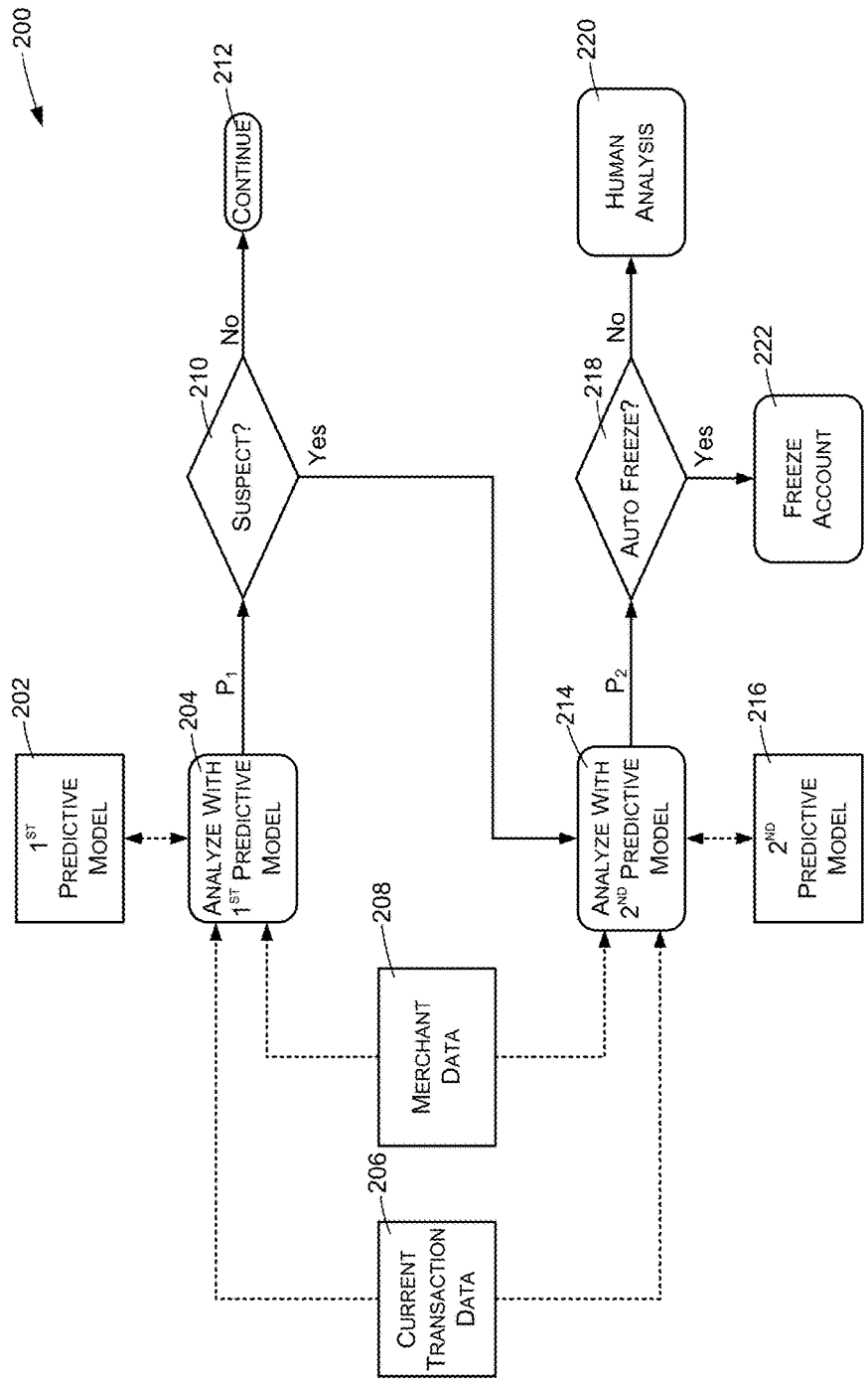
FIG. 2 is a flow diagram illustrating an example method of detecting and reviewing suspected purchase transactions, and for automatically freezing accounts associated with certain of the transactions.

FIG. 2 illustrates an example method 200 for analyzing purchase transactions to detect and/or predict the possibility that a particular transaction is fraudulent. The method 200 may be performed by the transaction service 108 in an environment such as shown by FIG. 1, in which a merchant 102 submits a transaction to a transaction service 108 for payment processing. The method 200 may also be performed in other environments. For example, the method 200 may be performed in any environment in which an automated service processes charges, such as credit card charges or debit card charges, on behalf of merchants and/or customers.

In the illustrated example, the method 200 is performed in response to receiving a transaction request from a merchant, wherein the transaction request corresponds to a transaction being conducted between the merchant and a customer. Each transaction request is an attempt to initiate a transfer of funds from a customer account to a merchant account. The method 200 may be used to determine whether to freeze a merchant account or an account associated with some other entity because of suspected fraud.

The method 200 includes two analysis phases: a first phase that identifies transactions suspected of being fraudulent (referred to herein as suspect transactions) and a second phase in which the suspect transactions are analyzed to determine whether to freeze the merchant service accounts with which the suspect transactions are associated.

The first analysis phase is based on a first predictive model 202 that has been previously generated using machine learning techniques based on historical training data (not shown). The historical training data may comprise different types of information about merchants and about customers who have purchased from the merchants. For example, the historical training data may include transaction data corresponding to multiple historical transactions conducted by multiple merchants with multiple customers using the transaction service 108 and/or other services. Transaction data may include details regarding individual transactions and transaction requests, including items purchased, amounts, times and dates, merchant and customer identities, locations of transactions, delivery destinations for purchases, and various other aspects of individual transactions. In addition, for each historical transaction the historical training data may indicate whether the transaction was ultimately determined to be a fraudulent transaction.

An action 204, which is part of the first analysis phase, comprises analyzing current transaction data 206 and various merchant data 208 using the first predictive model 202 to determine a probability $P_1$, referred to herein as a fraud probability, that the transaction represented by the current transaction data 206 is fraudulent.

The current transaction data 206, which corresponds to a current transaction being conducted between a merchant and a customer, may include many types of information, including data received from the merchant contemporaneously with conducting the current transaction. For example, the current transaction data 206 may include line-item details regarding a purchase, such as the items being purchased and the prices being charged for the items. The current transaction data 206 may include the addresses and/or current locations of the merchant and the customer, the IP address from which the merchant is communicating, the time-of-day of the purchase transaction, the identity of the purchaser, delivery or shipping addresses for items of the transaction, various information stored in cookies on a merchant device, details regarding a payment instrument being used by the purchaser to conduct the transaction, specification of a merchant account into which funds are to be transferred, an identity of a merchant employee who is conducting the current transaction, and so forth.

The merchant data 208 may include historical transaction data corresponding to previous transactions conducted by the merchant with various customers. For each of multiple historical purchase transaction, the historical transaction data may include information similar to that mentioned above with respect to the current transaction data 206. In addition, the merchant data 208 may indicate other information about the merchant, such as the type of business conducted by the merchant. For example, the merchant data 208 may indicate that the merchant is a barber, a car dealership, an online retailer, a mobile food truck, or some other category of business. The merchant data may include various other attributes and/or characteristics of the merchant, such as the merchant's street address, bank accounts and other financial information relating to the merchant, historical revenues of the merchant, credit ratings of the merchant, and so forth.

An action 210 comprises determining whether the current transaction is a suspect transaction. That is, action 210 comprises declaring, based at least in part on the fraud probability $P_1$, whether the current transaction should be classified as suspect. Specific techniques for performing the action 210 will be described below.

If the current transaction is not declared suspect in the action 210, the transaction is allowed to proceed as indicated by the block 212. That is, the transaction service 108 processes the transaction and initiates transfer of the requested funds from the customer account to the merchant account.

The second analysis phase is based on a second predictive model 216 that has been previously generated using machine learning techniques based on historical training data (not shown). The historical training data may comprise different types of information about merchants and about customers who have purchased from the merchants. For example, the historical training data may include transaction data corresponding to multiple historical transactions conducted by multiple merchants with multiple customers, for which manual human analyses were performed in order to determine whether to disable accounts of requesting merchants. For each historical transaction, the historical training data may indicate whether an analysis of the transaction by a human analyst resulted in freezing the associated merchant service account.

The action 214 comprises analyzing the current transaction data 206 and the historical merchant data 208 using the second predictive model 216 to determine a probability $P_2$, referred to herein as a freeze probability, that an analysis of the transaction and associated data by a human analyst will result in the human analyst freezing the merchant account with which the current transaction is associated.

An action 218 comprises determining whether the merchant account associated with the current transaction will be automatically frozen without human analysis, or whether the transaction will be submitted to a human analyst for further review. Details regarding the decision 218 will be described in more detail below. The action 218 is based at least in part on the freeze probability $P_2$.

If the merchant account is to be automatically frozen, an action 222 is performed of automatically freezing the merchant account, without review by a human analyst. If the merchant account is not to be automatically frozen, an action 220 is performed of submitting the transaction to a human analyst for manual review. Upon review, the analyst may make a decision whether or not to freeze the associated merchant account.

The predictive models 202 and 216 may be constructed using machine learning techniques, in which large sets of training data are analyzed. A predictive model may be represented using an algorithmic paradigm such as random forests, as one example.

Figure 3:
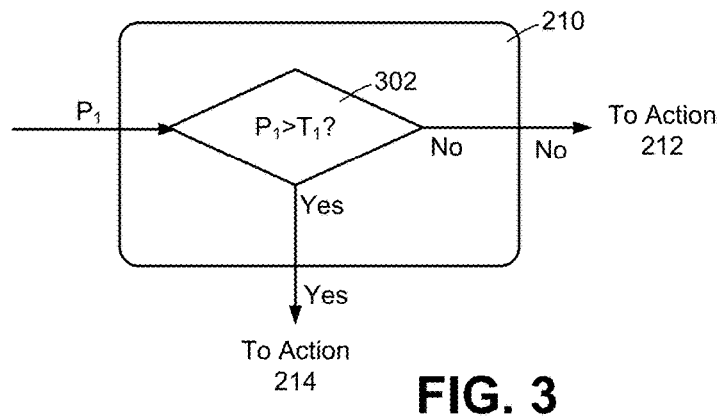
FIG. 3 is a flow diagram illustrating an example implementation of the action 210 of FIG. 2.

FIG. 3 illustrates an example implementation of the action 210, which determines whether a given transaction is considered to be suspect and consequently submitted to the second phase of analysis. In this example, the action 210 comprises a comparison 302 of the fraud probability $P_1$ to a fraud probability threshold $T_1$. If the fraud probability $P_1$ is not greater than the fraud probability threshold $T_1$, the result of the action 210 is "no" and the method 200 continues with the action 212. If the fraud probability $P_1$ is greater than the fraud probability threshold $T_1$, the result of the action 210 is "yes" and the current transaction is submitted to the second analysis phase, beginning at the action 214.

The fraud probability threshold $T_1$ may be set to a level above which it is more likely than not that subsequent human analysis would otherwise result in freezing the merchant account. In some embodiments, as will be described in more detail blow, the fraud probability threshold $T_1$ may be based upon an economic analysis in which manual review costs are weighed against the loss reductions resulting from manual reviews, and/or a work satisfaction analysis that attempts to establish a review freeze rate that results in a certain degree of human analyst satisfaction.

Figure 4:
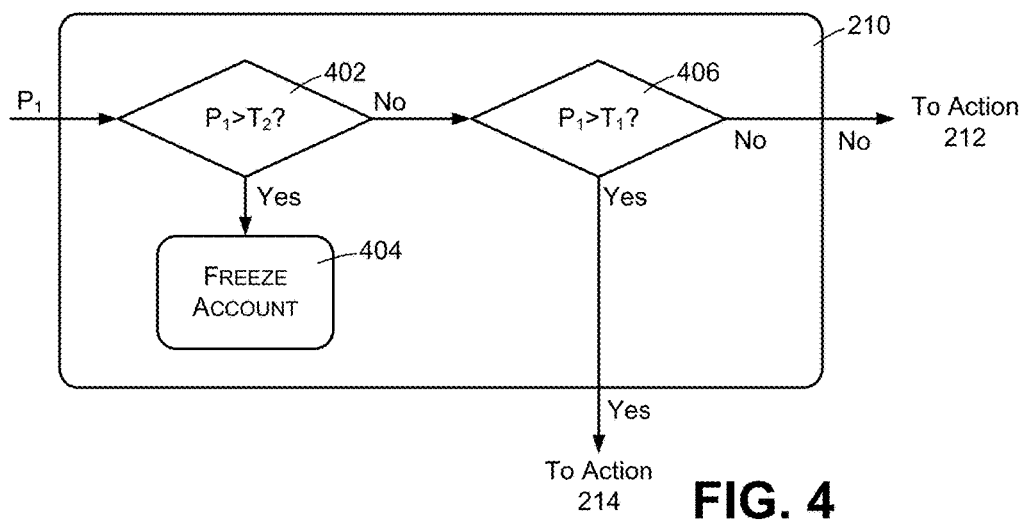
FIG. 4 is a flow diagram illustrating another example implementation of the action 210 of FIG. 2.

FIG. 4 illustrates another example implementation of the action 210. This implementation includes an action 402 of comparing the fraud probability $P_1$ to a second fraud probability threshold $T_2$, where $T_2 > T_1$. If the fraud probability $P_1$ is greater than the second probability threshold $T_2$, an action 404 is performed of automatically freezing the merchant account associated with the current account, without further analysis. If the fraud probability $P_1$ is not greater than the second probability threshold $T_2$, an action 406 is performed of comparing the fraud probability $P_1$ to the fraud probability threshold $T_1$. If the fraud probability $P_1$ is not greater than the fraud probability threshold $T_1$, the result of the action 210 is "no" and the method 200 continues with the action 212. If the fraud probability $P_1$ is greater than the fraud probability threshold $T_1$, the result of the action 210 is "yes" and the current transaction is submitted to the second analysis phase, beginning at the action 214.

Figure 5:
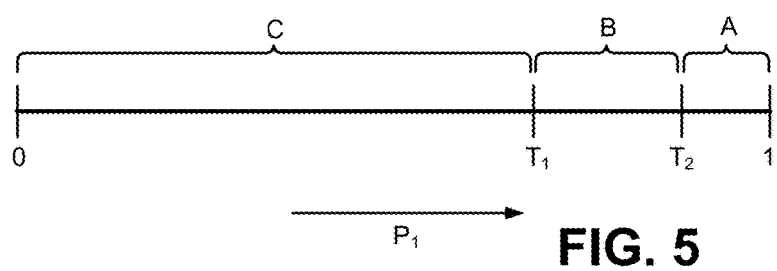
FIG. 5 is a graph illustrating threshold ranges that are identified by the example implementation of FIG. 4.

FIG. 5 illustrates the effect of the implementation shown by FIG. 4. FIG. 5 is a graph having a horizontal axis corresponding, from left to right, to increasing values of $P_1$. FIG. 5 assumes that $P_1$ ranges from 0 to 1, corresponding to 0% and 100% probabilities.

A range A corresponds to $P_1$ values between $T_2$ and 1. The merchant accounts associated with all transactions having fraud probabilities $P_1$ within the range A are frozen in the action 404. A range B corresponds to $P_1$ values between $T_1$ and $T_2$. The transactions having fraud probabilities $P_1$ within the range B are analyzed further in the second analysis phase, beginning with the action 214. A range C corresponds to $P_1$ values between 0 and $T_1$. The transactions having fraud probabilities $P_1$ within the range C are allowed to proceed without further analysis, by continuing to the action 212 of FIG. 2.

Figure 6:
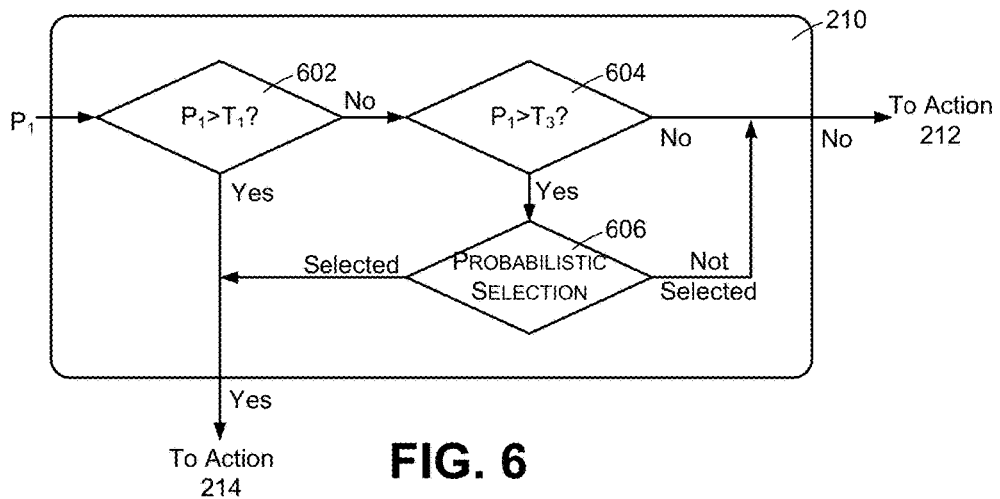
FIG. 6 is a flow diagram illustrating another example implementation of the action 210 of FIG. 2.

FIG. 6 illustrates yet another example implementation of the action 210. This implementation includes an action 602 of comparing the fraud probability $P_1$ to the fraud probability threshold $T_1$. If the fraud probability $P_1$ is greater than the fraud probability threshold $T_1$, the result of the action 210 is "yes," and the method 200 continues to the second analysis phase beginning with the action 214. If the fraud probability $P_1$ is not greater than the fraud probability threshold $T_1$, an action 604 is performed of comparing the fraud probability $P_1$ to a third fraud probability threshold $T_3$, where $T_3 < T_1$. If the fraud probability $P_1$ is not greater than the third fraud probability threshold $T_3$, the result of the action 210 is "no" and the method 200 continues with the action 212.

If the fraud probability $P_1$ is greater than the third fraud probability threshold $T_3$, an action 606 is performed. The action 606 comprises randomly and/or probabilistically determining whether the current transaction will be declared suspect and therefore selected for further processing. If the current transaction is selected for further processing, the result of the action 210 is "yes, and the method 200 continues to the second analysis phase beginning with the action 214. If the current transaction is not selected, the result of the action 210 is "no" and the method 200 continues with the action 212.

The action 606 may be performed by selecting a given percentage of the transactions for which the fraud probability $P_1$ is between $T_3$ and $T_1$. For example, every fourth transaction may be selected for second phase analysis. In some cases, selections may be weighted in accordance with $P_1$, so that higher percentages of transactions are selected as $P_1$ increases toward $T_1$.

The action 606 may be performed in certain embodiments in order to evaluate the performance and/or accuracy of the first predictive model, and/or the appropriateness of the fraud threshold $T_1$. For example, if a significant number of the probabilistically selected transactions are eventually found to be fraudulent, the fraud threshold $T_1$ may need to be lowered and/or the first model may need to be retrained. In addition, performing second-pass review of transactions where the fraud probability $P_1$ is below the fraud threshold $T_1$ provides additional training points that may be used in future training of the first model.

Figure 7:
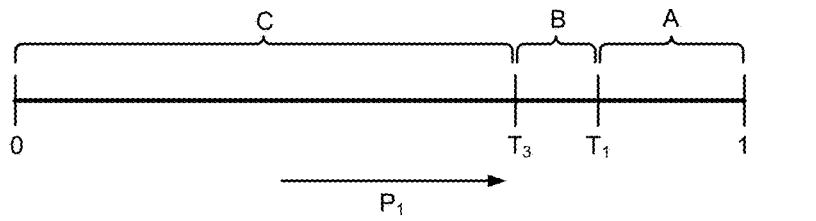
FIG. 7 is a graph illustrating threshold ranges that are identified by the example implementation of FIG. 6.

FIG. 7 illustrates the effect of the implementation shown by FIG. 6. FIG. 7 is a graph having a horizontal axis corresponding, from left to right, to increasing values of $P_1$. FIG. 7 assumes $P_1$ ranges from 0 to 1, corresponding to 0% and 100% probabilities.

A range A corresponds to $P_1$ values between $T_1$ and 1. The merchant accounts associated with all transactions having fraud probabilities $P_1$ within the range A are sent on for second phase processing, to the action 214. A range B corresponds to $P_1$ values between $T_3$ and $T_1$. The transactions having fraud probabilities $P_1$ within the range B are probabilistically sampled so that a subset of these transactions are sent on to second phase processing. The remaining transactions are allowed to proceed without further analysis, by continuing to the action 212 of FIG. 2.

Figure 8:
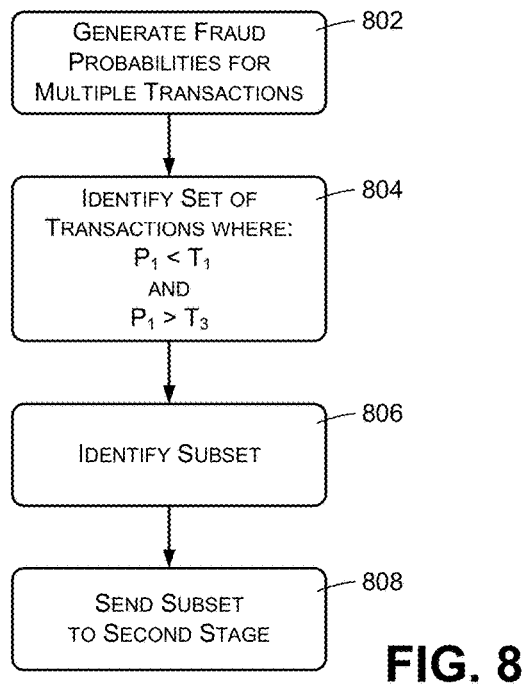
FIG. 8 is a flow diagram illustrating further actions that may be performed in conjunction with the example method shown by FIG. 2.

FIG. 8 shows an example method 800, illustrating further details regarding the sampling that is accomplished by the actions of FIG. 6. The method 800 may be used to supplement the first stage of the method 200, in order to send additional purchase transactions to the action 214 of the second phase.

An action 802 comprises generating fraud probabilities for multiple purchase transactions. The multiple purchase transactions may comprise purchase transactions from multiple merchants with multiple customers. In some cases, the multiple purchase transactions may comprise all or nearly all of the purchase transactions processed by the transaction service 108.

An action 804 comprises identifying a set of the purchase transactions whose fraud probabilities $P_1$ are less than the first threshold $T_1$ and greater than the third threshold $T_3$, where the third threshold $T_3$ is less than the first threshold $T_1$. Stated generally, the action 804 identifies a set of purchase transactions having fraud probabilities $P_1$ that are within a range of fraud probabilities that is below the first threshold $T_1$.

An action 806 comprises identifying a subset of the set of purchase transactions identified in the action 804. For example, the subset may comprise a fixed percentage of the transactions of the set, which are selected randomly from those transactions having fraud probabilities $P_1$ that are between the first threshold $T_1$ and the third threshold $T_3$.

An action 808 comprises sending the identified subset to the second analysis phase of FIG. 1, such as to the action 214.

Figure 9:
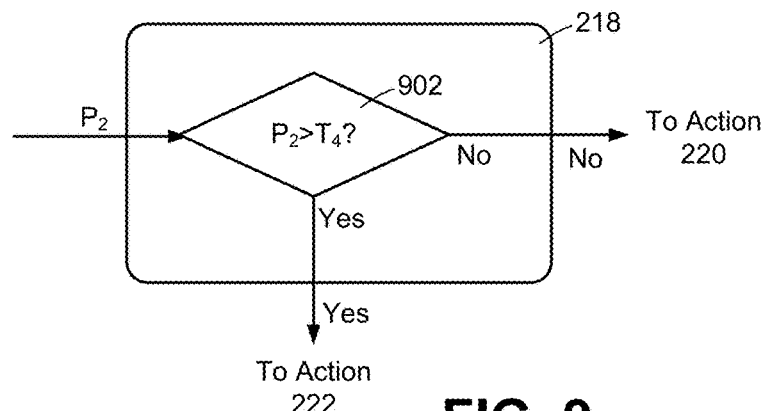
FIG. 9 is a flow diagram illustrating an example implementation of the action 218 of FIG. 2.

FIG. 9 illustrates an example implementation of the action 218, which determines whether a given transaction will be automatically frozen or whether a human analysis of the transaction will be initiated. In this example, the action 218 comprises a comparison 902 of the freeze probability $P_2$ to a freeze probability threshold $T_4$. If the freeze probability $P_1$ is not greater than the freeze probability threshold $T_4$, the result of the action 218 is "no" and human analysis is initiated in the action 220. If the freeze probability $P_1$ is greater than the freeze probability threshold $T_4$, the result of the action 218 is "yes" and the merchant account associated with the transaction is frozen without further human analysis.

The freeze probability threshold $T_4$ may be set to a level above which it is relatively certain that subsequent human analysis would otherwise result in freezing the merchant account. The described method reduces the workload on human analysts, while still ensuring that transactions having relatively uncertain fraud likelihoods are resolved by humans.

Figure 10:
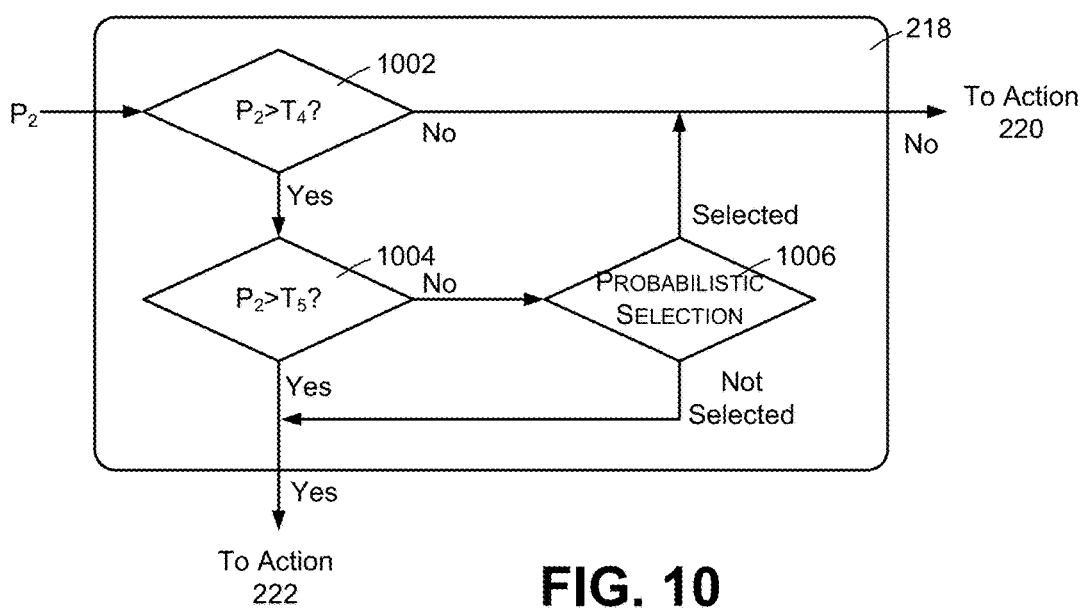
FIG. 10 is a flow diagram illustrating another example implementation of the action 218 of FIG. 2.

FIG. 10 illustrates another example implementation of the action 218. This implementation includes an action 1002 of comparing the freeze probability $P_2$ to the freeze probability threshold $T_4$. If the freeze probability $P_2$ is not greater than the freeze probability threshold $T_4$, the result of the action 218 is "no" and the transaction is submitted for manual review by a human analyst in the action 220. If the freeze probability $P_2$ is greater than the freeze probability threshold $T_4$, an action 1004 is performed of comparing the freeze probability $P_2$ to a freeze probability threshold $T_5$, where $T_5 > T_4$. If the freeze probability $P_1$ is greater than the freeze probability threshold $T_5$, the result of the action 218 is "yes" and the associated merchant account is automatically frozen in the action 222 without human analysis.

If the freeze probability $P_2$ is not greater than the freeze probability threshold $T_5$ in the action 1004, an action 1006 is performed. The action 1006 comprises determining whether the current transaction will be selected for human analysis, based on a probabilistic sampling of the transactions having $P_2$ between $T_4$ and $T_5$. If the current transaction is selected for human analysis, the result of the action 218 is "no" and transaction is analyzed by a human analyst in the action 220. If the current transaction is not selected, the result of the action 218 is "yes" and the associated merchant account is automatically frozen in the action 222 without further human analysis.

The action 1006 may be performed by selecting a given percentage of the transactions for which the freeze probability threshold $P_2$ is between $T_4$ and $T_5$. For example, every fifth transaction may be selected for human analysis, despite the freeze probability greater than $T_4$. In some cases, selections may be weighted in accordance with $P_2$, so that higher percentages of transactions are selected as $P_2$ increases toward $T_5$.

The action 1006 may be performed in certain embodiments in order to evaluate the performance and/or accuracy of the second predictive model, and/or the appropriateness of the current fraud thresholds. For example, if a significant number of the probabilistically selected transactions result in freezing associated accounts, the freeze probability threshold $T_4$ may need to be raised and/or the second model may need to be retrained. In addition, performing human analyses of transactions where the freeze probability $P_2$ is above the freeze probability threshold $T_4$ provides additional training points that may be used in future training of the second model.

Figure 11:
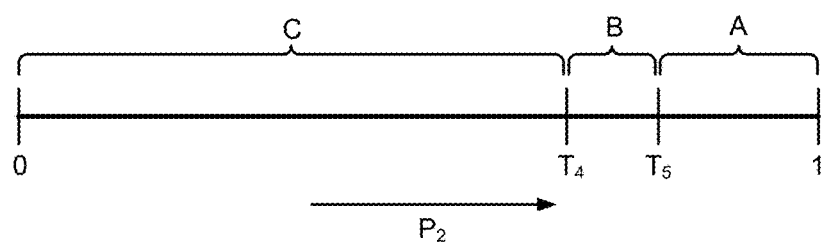
FIG. 11 is a graph illustrating threshold ranges that are identified by the example implementation of FIG. 10.

FIG. 11 illustrates the effect of the implementation shown by FIG. 10. FIG. 11 is a graph having a horizontal axis corresponding, from left to right, to increasing values of $P_2$. FIG. 11 assumes $P_1$ ranges from 0 to 1, corresponding to 0% and 100% probabilities.

A range A corresponds to $P_2$ values between $T_5$ and 1. The merchant accounts associated with all transactions having freeze probabilities $P_2$ within the range A are automatically frozen, without human analysis. A range B corresponds to $P_2$ values between $T_4$ and $T_5$. The transactions having freeze probabilities $P_2$ within the range B are probabilistically sampled so that a subset of these transactions are sent on to be analyzed by human analysts. The remaining transactions are automatically frozen without human analysis.

Figure 12:
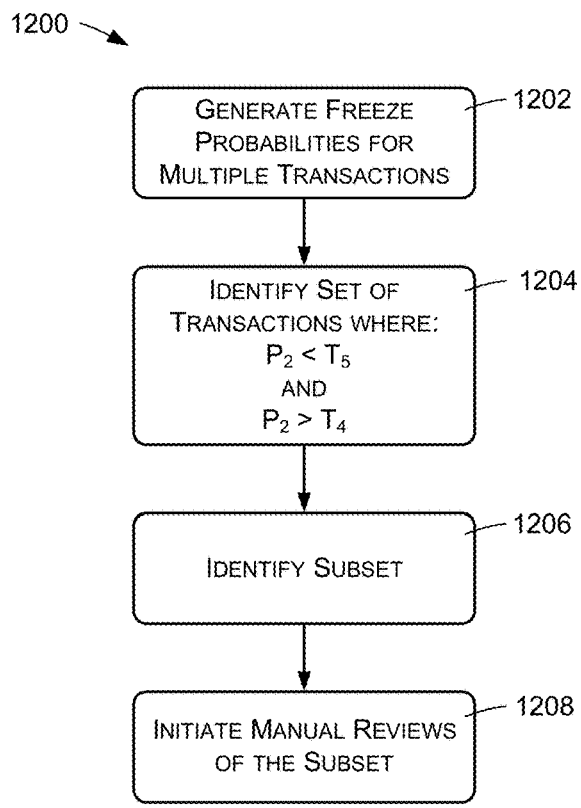
FIG. 12 is a flow diagram illustrating further actions that may be performed in conjunction with the example method shown by FIG. 2.

FIG. 12 shows an example method 1200, illustrating further details regarding the sampling that is accomplished by the actions of FIG. 10. The method 1200 may be used to supplement the second phase of the method 200, in order to initiate manual reviews of additional purchase transactions.

An action 1202 comprises generating freeze probabilities for multiple purchase transactions. The multiple purchase transactions may comprise purchase transactions from multiple merchants with multiple customers. In some cases, the multiple purchase transactions may comprise all or nearly all of the purchase transactions processed by the transaction service 108.

An action 1204 comprises identifying a set of the purchase transactions whose freeze probabilities $P_2$ are less than the freeze probability threshold $T_5$ and greater than the freeze probability threshold $T_4$, where $T_5 > T_4$.

An action 1206 comprises identifying a subset of the set of purchase transactions identified in the action 1204. For example, the subset may comprise a fixed percentage of the transactions of the set, which are selected randomly from those transactions having freeze probabilities $P_2$ that are between $T_4$ and $T_5$.

An action 1208 comprises initiating manual reviews of the identified subset of transactions, such as performing the action 220 with respect to each of the each of the subset of transactions.

Figure 13:
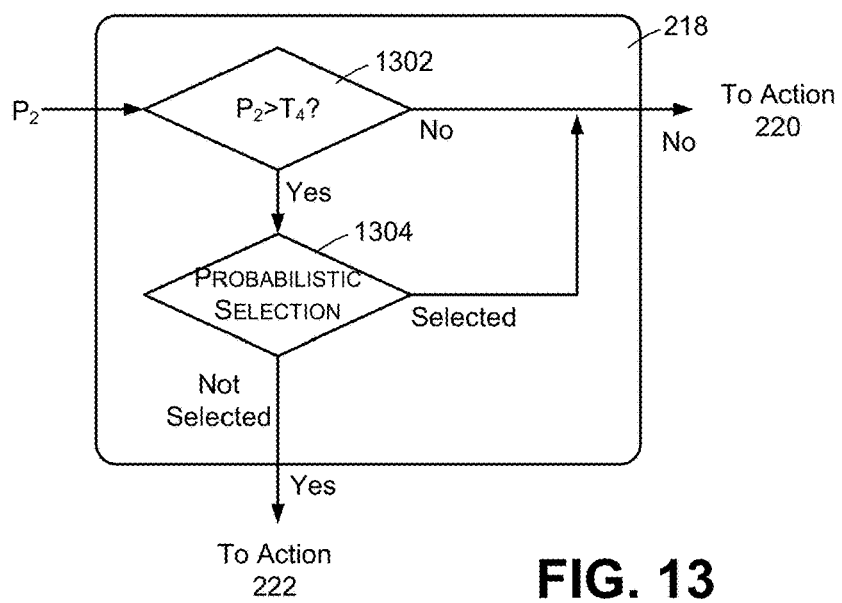
FIG. 13 is a flow diagram illustrating another example implementation of the action 218 of FIG. 2.

FIG. 13 illustrates another example implementation of the action 218. This implementation includes an action 1302 of comparing the freeze probability $P_2$ to the freeze probability threshold $T_4$. If the freeze probability $P_2$ is not greater than the freeze probability threshold $T_4$, the result of the action 218 is "no" and the transaction is submitted for manual review by a human analyst in the action 220.

If the freeze probability $P_2$ is greater than the freeze probability threshold $T_4$, an action 1304 is performed. The action 1304 comprises determining whether the current transaction will be selected for human analysis, based on a probabilistic sampling of the transactions having $P_2$ above $T_4$. If the current transaction is selected for human analysis, the result of the action 218 is "no" and transaction is analyzed by a human analyst in the action 220. If the current transaction is not selected, the result of the action 218 is "yes" and the associated merchant account is automatically frozen in the action 222 without further human analysis.

The action 1304 may be performed by selecting a given percentage of the transactions for which the freeze probability $P_2$ is above $T_4$. For example, every tenth transaction may be selected for human analysis, despite the freeze probability being greater than $T_4$.

The action 1304 may be performed in certain embodiments in order to evaluate the performance and/or accuracy of the second predictive model, and/or the appropriateness of the current fraud thresholds. For example, if a significant number of the probabilistically selected transactions result in freezing associated accounts, the freeze probability threshold $T_4$ may need to be raised and/or the second model may need to be retrained. In addition, performing human analyses of transactions where the freeze probability $P_2$ is above the freeze probability threshold $T_4$ provides additional training points that may be used in future training of the second model.

Figure 14:
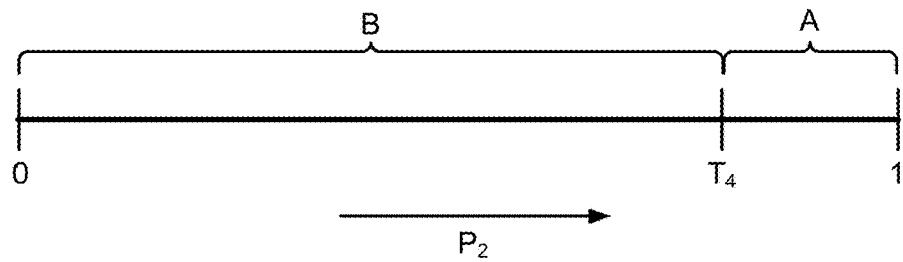
FIG. 14 is a graph illustrating threshold ranges that are identified by the example implementation of FIG. 13.

FIG. 14 illustrates the effect of the implementation shown by FIG. 13. FIG. 14 is a graph having a horizontal axis corresponding, from left to right, to increasing values of $P_2$. FIG. 14 assumes $P_2$ ranges from 0 to 1, corresponding to 0% and 100% probabilities.

A range A corresponds to $P_2$ values greater than $T_4$. The transactions having freeze probabilities $P_2$ within the range A are probabilistically sampled so that a subset of these transactions are sent on to be analyzed by human analysts. The remaining transactions are automatically frozen without further analysis. A range B corresponds to $P_2$ values below $T_4$. These transactions are sent on to be analyzed by human analysts.

Figure 15:
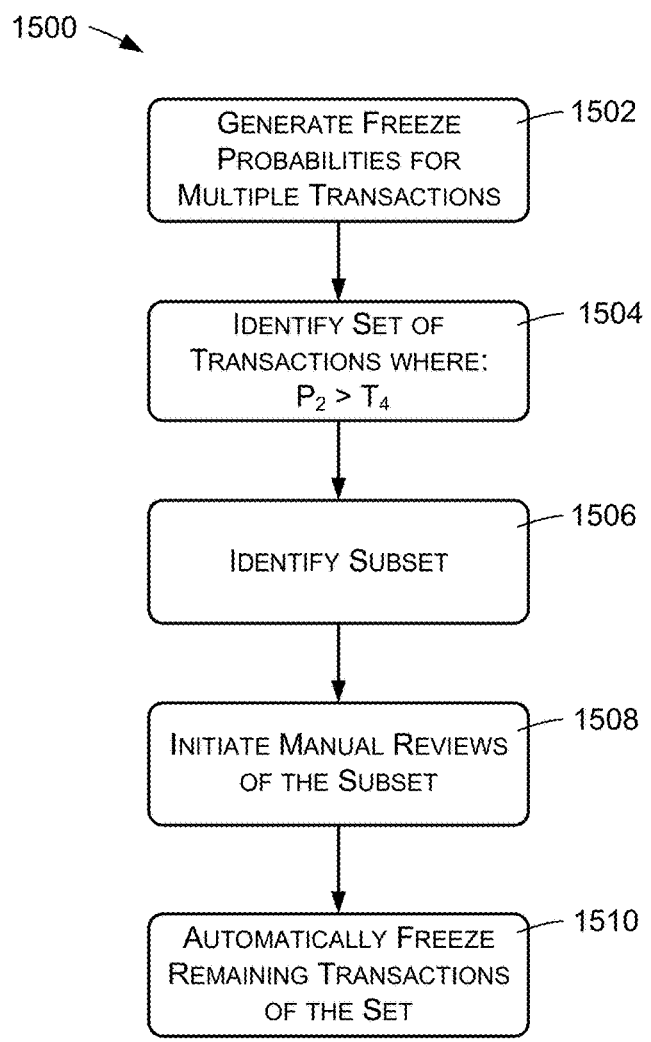
FIG. 15 is a flow diagram illustrating further actions that may be performed in conjunction with the example method shown by FIG. 2.

FIG. 15 shows an example method 1500, illustrating further details regarding the sampling that is accomplished by the actions of FIG. 13. The method 1500 may be used to supplement the second phase of the method 200, in order to initiate manual reviews of additional purchase transactions.

An action 1502 comprises generating freeze probabilities for multiple purchase transactions. The multiple purchase transactions may comprise purchase transactions from multiple merchants with multiple customers. In some cases, the multiple purchase transactions may comprise all or nearly all of the purchase transactions processed by the transaction service 108.

An action 1504 comprises identifying a set of the purchase transactions whose freeze probabilities $P_2$ are greater than the freeze probability threshold $T_4$.

An action 1506 comprises identifying a subset of the set of purchase transactions identified in the action 1504. For example, the subset may comprise a fixed percentage of the transactions of the set, which are selected randomly from those transactions having freeze probabilities $P_2$ that are greater than $T_4$.

An action 1308 comprises initiating manual reviews of the identified subset of transactions, such as performing the action 220 with respect to each of the each of the subset of transactions. The remaining transactions of the set are automatically frozen, without human analysis, in an action 1510.

Figure 16:
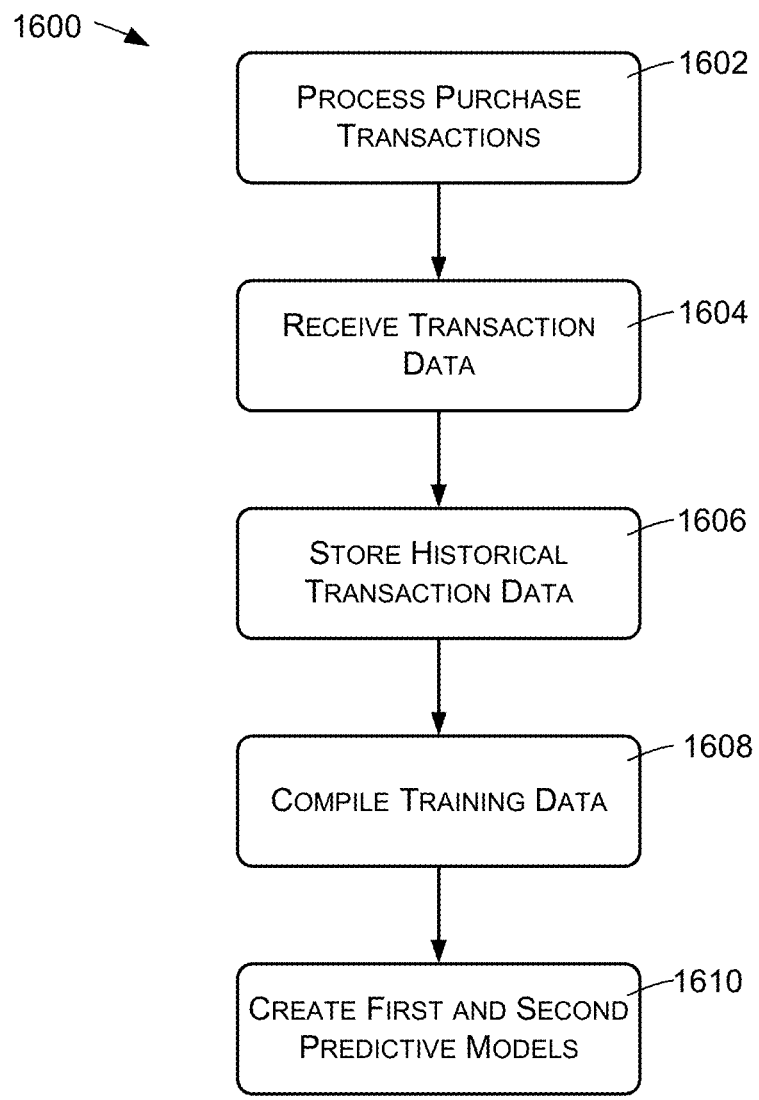
FIG. 16 is a flow diagram illustrating yet further actions that may be performed in conjunction with the example method shown by FIG. 2.

FIG. 16 illustrates further actions 1600 that may be performed by the transaction service 108. The actions 1300 may be performed prior to or contemporaneously with performing the method 200.

An action 1602 comprises processing multiple purchase transactions between customers using mobile POS computing devices, wherein each purchase transaction has a risk of being fraudulent and therefore subject to chargeback.

An action 1604 comprises receiving transaction data at one or more computers of the transaction processing system. The transaction data is associated with multiple purchase transactions, and at least a portion of the transaction data is received from the POS devices of the merchants.

An action 1606 comprises storing the transaction data as historical transaction data. For example, the transaction data for individual transactions may be archived in a database for use in future analyses.

An action 1608 comprises compiling training data comprising (a) the stored historical transaction data and (b) an indication, for each historical purchase transaction, of whether the purchase transaction was ultimately determined to be fraudulent. For example, transactions are often determined to be fraudulent when they become the subject of a chargeback by an issuing bank of a credit card payment In addition, for historical purchase transactions that were manually reviewed by human analysts, the training data may indicate whether the manual reviews resulted in freezing the associated merchant accounts.

An action 1610 comprises creating one or more predictive models based at least in part on the training data. For example, a first predictive model may produce a probability, given data corresponding to a particular merchant and transaction, that the transaction is fraudulent. As another example, a second predictive model may produce a probability, given data corresponding to a particular merchant and transaction, that human analysis of the data will result in freezing a merchant account associated with the transaction.

Figure 17:
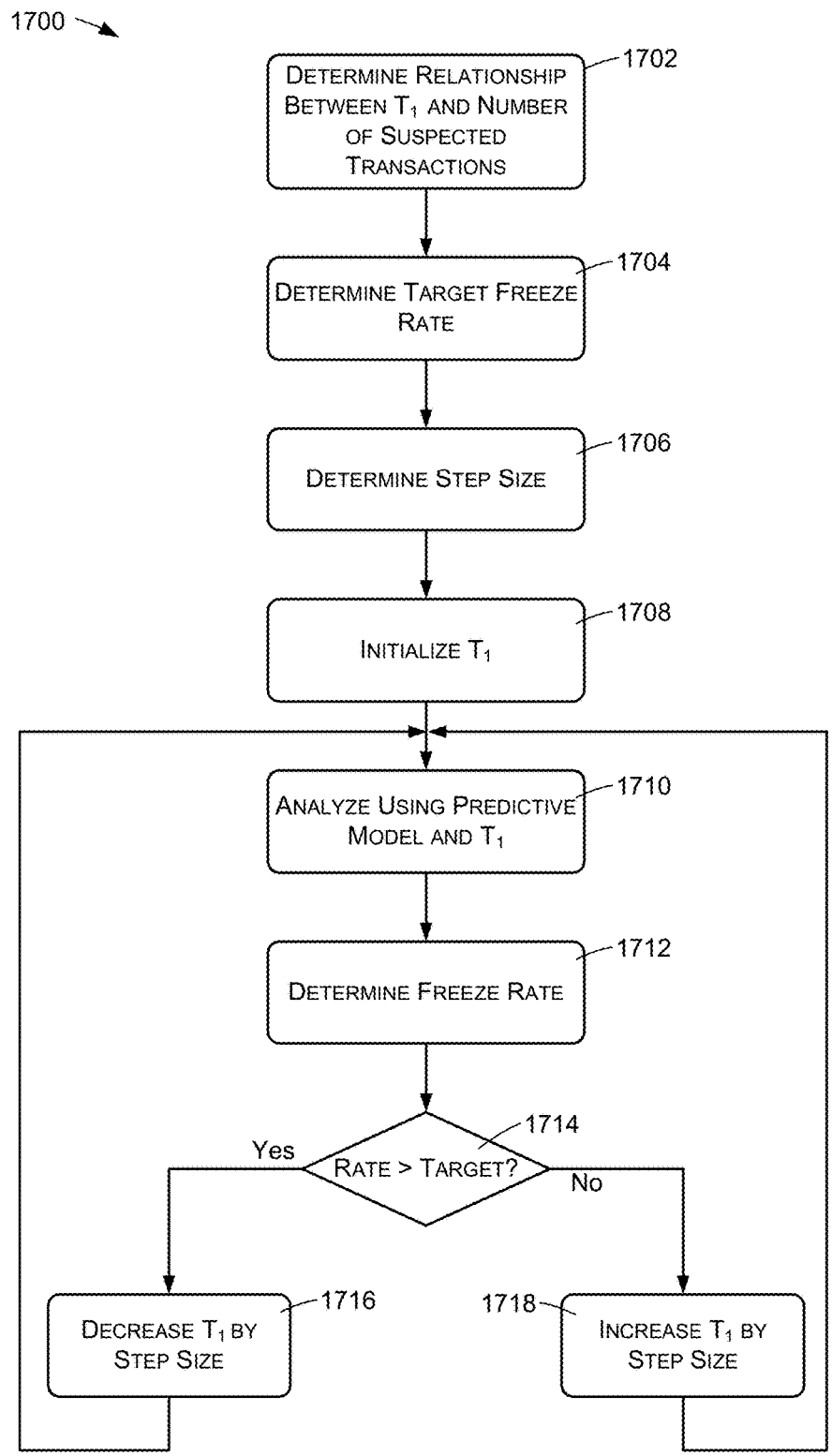
FIG. 17 is a flow diagram illustrating an example method of determining a probability threshold against which fraud probabilities are evaluated to determine whether to declare transactions as suspect.

FIG. 17 shows an example method 1700 that may be used in some embodiments to achieve a desired level or amount of account freezes, wherein the level or amount is referred to as a review freeze rate. For purposes of this discussion, the review freeze rate is the rate at which human analysis of suspected transactions results in freezing the associated merchant accounts. For example, given a number of transactions that are manually reviewed, the review freeze rate may be calculated as a ratio of the number of manually reviewed transactions that resulted in freezing the associated merchant accounts to the number of transactions that were manually reviewed.

The method 1700 may be used when introducing a new predictive model, such as the first predictive model 202 or the second predictive model 216 of FIG. 2. The method 1700 may be used to slowly increase the number of transactions that are manually reviewed as a result of the introduction of a new model, and further to regulate the number of transactions that are declared as suspect in order to eventually obtain a desired review freeze rate.

It should be noted that when using the method of FIG. 2, there is an inverse relationship between the number of declared suspect transactions and the resulting review freeze rate. Consider, for example, that the threshold $T_1$ is set very high, resulting in a relatively low number of suspect transactions. Because a high $T_1$ ensures that the suspect transactions will have high fraud probabilities, there will be a relatively high review freeze rate. If on the other hand $T_1$ is set relatively lower, suspect transactions will include transactions with lower fraud probabilities and there will accordingly be a lower review freeze rate. It follows from this observation that there is a direct relationship between $T_1$ and the review freeze rate: lowering $T_1$ lowers the review freeze rate.

An action 1702 comprises determining a relationship between the fraud threshold $T_1$ and the number of transactions that will be manually reviewed, for example as the result of the actions 204, 210, 214, and 218. The action 1702 may be performed by recording the freeze probabilities $P_2$ of analyzed transactions over a period of time such as one or more days to determine a distribution of freeze probabilities $P_2$. Based on this observed distribution, it may be determined, for any proposed value of $T_1$, the percentage or number of transactions that will be manually reviewed. Similarly, a relationship between changes in $T_1$ and resulting changes in the number of manually reviewed transactions can be determined.

An action 1704 comprises determining a target review freeze rate. In some embodiments it may be desired to establish the target review freeze rate at the highest value that still produces a positive return-on-investment (ROI), considering the expenses involved in manually reviewing transactions. For example, setting the target review freeze rate too high might result in review expenses for low-value transactions, such that the review expenses are greater than the values of the transactions themselves. In addition to human review expenses, less tangible expenses may also be accounted for, such as the future costs of lost business that may result from erroneously or over-aggressively freezing merchant accounts. Other expenses to be considered may include the time spent working with merchants to resolve disputes over frozen accounts and/or to determine that merchant accounts should be subsequently unfrozen. In addition, human analyst engagement and work satisfaction may be considered, and the target review freeze rate may be set to a value that results in a certain level of worker satisfaction.

The action 1704 may include determining a relationship between the review freeze rate and an amount of fraud loss reduction, determining costs of manual or non-automated analyses of purchase transactions, and setting the target review freeze rate based at least in part on the determined relationship. For example, the target review freeze rate may be set such the costs of manual or non-automated analyses do not exceed the amount of fraud loss reduction. The relationship between review freeze rate and amount of fraud loss reduction may in some cases be determined by analyzing historical data.

Conversely, setting the review freeze rate too low might result in revenue losses that could be efficiently prevented by additional human review.

An action 1706 comprises determining an appropriate $T_1$ step size. The $T_1$ step size is a value by which $T_1$ will be incremented or decremented in order to modulate the eventual review freeze rate, and may be determined based on the previously determined relationship between $T_1$ and the number of transactions that will be manually reviewed. The $T_1$ step size may be set to a relatively small value to ensure than adjustments to $T_1$ do not result in unacceptably large swings in review rates. This helps regulate analyst workloads to prevent analysts from becoming overwhelmed on one day and to then be without work on the next day.

An action 1708 comprises initializing $T_1$ to a starting value. For example, $T_1$ may initially be set to a value that is relatively certain to produce an observed review freeze rate that is greater than the target review freeze rate. In some situations, $T_1$ may initially be set to a relatively high value in order to avoid introducing a large influx of new review work to human analysts. For example, $T_1$ may be set initially to the value 1, which might result in no transactions being declared as suspect.

An action 1710 comprises performing the method 200 for a time period such as a day, a week, or some other time during which numerous transactions area analyzed. After this time period, an action 1712 is performed.

The action 1712 comprises determining an observed review freeze rate, which as mentioned above may comprise the ratio of the number of transaction reviews that resulted in account freezes to the number total number of manually reviewed transactions over the time period.

An action 1714 comprises comparing the observed review freeze rate to the target review freeze rate. If the observed review freeze rate is larger than the target review freeze rate, an action 1716 is performed of decreasing $T_1$ by the $T_1$ step size. If the observed review freeze rate is smaller than the target review freeze rate, an action 1718 is performed of increasing $T_1$ by the $T_1$ step size. The actions 1712, 1714, and 1716 may be implemented by calculating a difference between the observed freeze amount and the target freeze amount, and then adjusting $T_1$ to decrease the difference.

After the action 1716 or 1718, the method returns to the action 1710, forming a loop that is repeated over multiple time periods to periodically adjust $T_1$.

Figure 18:
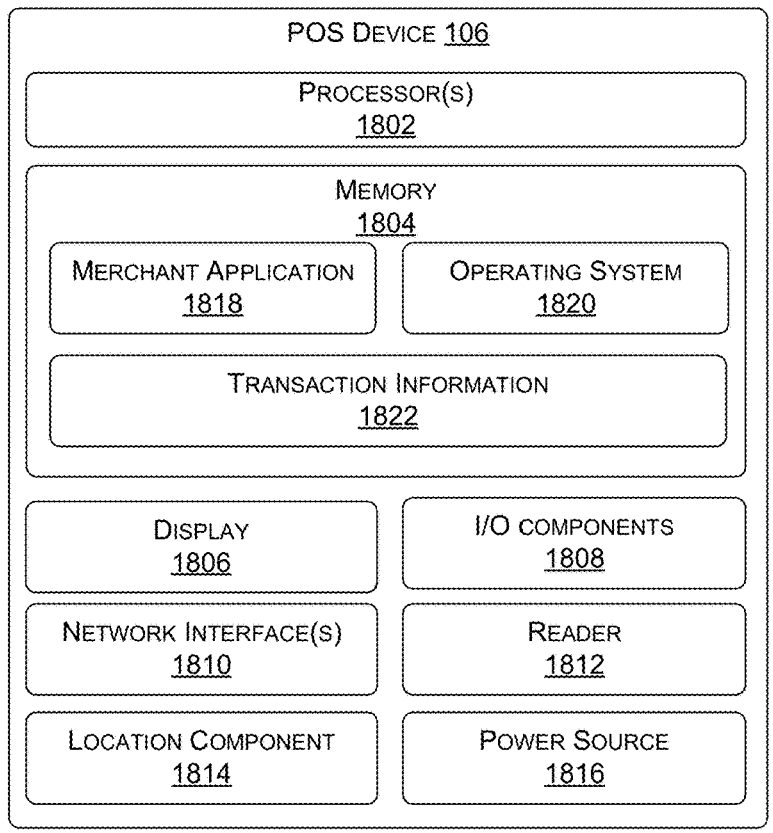
FIG. 18 is a block diagram of an example merchant point-of-sale device.

FIG. 18 illustrates select components of an example POS device 106 according to some implementations. The POS device 106 may be any suitable type of computing device, e.g., mobile, semi-mobile, semi-stationary, or stationary. Some examples of the POS device 106 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the POS device 106 includes at least one processor 1802, memory 1804, a display 1806, one or more input/output (I/O) components 1808, one or more network interfaces 1810, at least one card reader 1812, at least one location component 1814, and at least one power source 1816.

Each processor 1802 may itself comprise one or more processors or processing cores. For example, the processor 1802 can be implemented as one or more microprocessors, microcomputers, microcontrollers, digital signal processors, central processing units, state machines, logic circuitries, and/or any devices that manipulate signals based on operational instructions. In some cases, the processor 1802 may be one or more hardware processors and/or logic circuits of any suitable type specifically programmed or configured to execute the algorithms and processes described herein. The processor 1802 can be configured to fetch and execute computer-readable processor-executable instructions stored in the memory 1804.

Depending on the configuration of the POS device 106, the memory 1804 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 1804 may include, but is not limited to, RAM, ROM, EEPROM, flash memory, solid-state storage, magnetic disk storage, optical storage, and/or other computer-readable media technology. Further, in some cases, the POS device 106 may access external storage, such as RAID storage systems, storage arrays, network attached storage, storage area networks, cloud storage, or any other medium that can be used to store information and that can be accessed by the processor 1802 directly or through another computing device or network. Accordingly, the memory 1804 may be computer storage media able to store instructions, modules or components that may be executed by the processor 1802. Further, when mentioned, non-transitory computer-readable media exclude media such as energy, carrier signals, electromagnetic waves, and signals per se.

The memory 1804 may be used to store and maintain any number of functional components that are executable by the processor 1802. In some implementations, these functional components comprise instructions or programs that are executable by the processor 1802 and that, when executed, implement operational logic for performing the actions and services attributed above to the POS device 106. Functional components of the POS device 106 stored in the memory 1804 may include a merchant application 1818, which may present an interface on the POS device 106 to enable the merchant to conduct transactions, receive payments, and so forth, as well as communicating with the transaction service 108 for processing payments and sending transaction information. Further, the merchant application 1818 may present an interface to enable the merchant to manage the merchant's account, and the like.

Additional functional components may include an operating system 1820 for controlling and managing various functions of the POS device 106 and for enabling basic user interactions with the POS device 106. The memory 1804 may also store transaction information/data 1822 that is received based on the merchant associated with the POS device 106 engaging in various transactions with customers.

In addition, the memory 1804 may also store data, data structures and the like, that are used by the functional components. For example, this data may include item information that includes information about the items offered by the merchant, which may include images of the items, descriptions of the items, prices of the items, and so forth. Depending on the type of the POS device 106, the memory 1804 may also optionally include other functional components and data, which may include programs, drivers, etc., and the data used or generated by the functional components. Further, the POS device 106 may include many other logical, programmatic and physical components, of which those described are merely examples that are related to the discussion herein.

The network interface(s) 1810 may include one or more interfaces and hardware components for enabling communication with various other devices over a network or directly. For example, network interface(s) 1810 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The I/O components 1808 may include speakers, a microphone, a camera, various user controls (e.g., buttons, a joystick, a keyboard, a keypad, etc.), and/or a haptic output device, and so forth.

In addition, the POS device 106 may include or may be connectable to a payment instrument reader 1812. In some examples, the reader 1812 may plug in to a port in the POS device 106, such as a microphone/headphone port, a data port, or other suitable port. In other instances, the reader 1812 is integral with the POS device 106. The reader 1812 may include a read head for reading a magnetic strip of a payment card, and further may include encryption technology for encrypting the information read from the magnetic strip. Alternatively, numerous other types of card readers may be employed with the POS devices 106 herein, depending on the type and configuration of a particular POS device 106.

The location component 1814 may include a GPS device able to indicate location information, or the location component 1814 may comprise any other location-based sensor. The POS device 106 may also include one or more additional sensors (not shown), such as an accelerometer, gyroscope, compass, proximity sensor, and the like. Additionally, the POS device 106 may include various other components that are not shown, examples of which include removable storage, a power control unit, and so forth.

Figure 19:
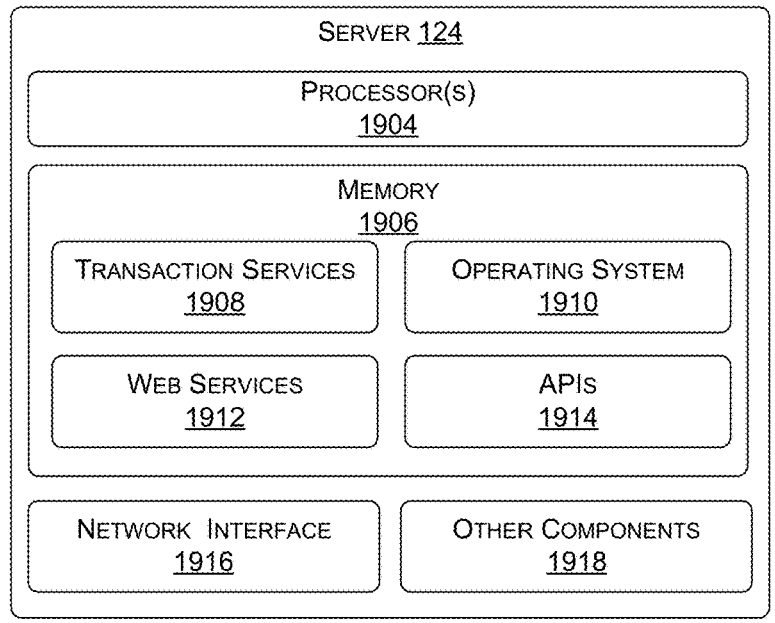
FIG. 19 is a block diagram of an example server that may be used to implement the transaction service described herein.

FIG. 19 shows an example of a server 124, which may be used to implement the functionality of the transaction service 108 as described herein. Generally, the transaction service 108 may be implemented by a plurality of servers 124.

In the illustrated example, the server 124 includes at least one processor 1904 and associated memory 1906. Each processor 1904 may itself comprise one or more processors or processing cores. For example, the processor 1904 can be implemented as one or more microprocessors, microcomputers, microcontrollers, digital signal processors, central processing units, state machines, logic circuitries, and/or any devices that manipulate signals based on operational instructions. In some cases, the processor 1904 may be one or more hardware processors and/or logic circuits of any suitable type specifically programmed or configured to execute the algorithms and processes described herein. The processor 1904 can be configured to fetch and execute computer-readable processor-executable instructions stored in the memory 1906.

Depending on the configuration of the server 124, the memory 1906 may be an example of tangible non-transitory computer storage media and may include volatile and non-volatile memory and/or removable and non-removable media implemented in any type of technology for storage of information such as computer-readable processor-executable instructions, data structures, program modules or other data. The memory 1906 may include, but is not limited to, RAM, ROM, EEPROM, flash memory, solid-state storage, magnetic disk storage, optical storage, and/or other computer-readable media technology. Further, in some cases, the server 124 may access external storage, such as RAID storage systems, storage arrays, network attached storage, storage area networks, cloud storage, or any other medium that can be used to store information and that can be accessed by the processor 1904 directly or through another computing device or network. Accordingly, the memory 1906 may be computer storage media able to store instructions, modules or components that may be executed by the processor 1904. Further, when mentioned, non-transitory computer-readable media exclude media such as energy, carrier signals, electromagnetic waves, and signals per se.

The memory 1906 may be used to store and maintain any number of functional components that are executable by the processor 1904. In some implementations, these functional components comprise instructions or programs that are executable by the processor 1904 and that, when executed, implement operational logic for performing the actions and services attributed above to the transaction service 108. Functional components stored in the memory 1906 may include a transaction services component 1908 that receives, processes and responds to transaction requests such as authorization requests, capture requests, and quick deposit requests in accordance with the preceding discussion.

Additional functional components may include an operating system 1910 and a web services component 1912. The memory 1906 may also store APIs (application programming interfaces) 1914 that are used for communications between the server 124 and the POS devices 106. The memory 1906 may also store data, data structures and the like, that are used by the functional components.

The server 124 may have a network communications interface 1916, such as an Ethernet communications interface, which provides communication by the server 124 with other servers, with the Internet, and ultimately with the POS devices 106.

The server 124 may of course include many other logical, programmatic, and physical components 1918 that are not specifically described herein.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method performed by one or more computers of a transaction processing system, the method comprising:
   processing multiple purchase transactions between merchants and customers using point-of-sale (POS) computing devices, wherein each purchase transaction has a risk of being fraudulent;
   receiving transaction data at the one or more computers of the transaction processing system, the transaction data being associated with the multiple purchase transactions, at least a portion of the transaction data being received from the POS computing devices;
   storing the received transaction data as historical transaction data;
   compiling training data, the training data comprising (a) the stored historical transaction data and (b) an indication, for each historical purchase transaction of multiple historical purchase transactions, of whether a human analyst froze a first merchant account as a result of analyzing historical transaction data associated with the historical purchase transaction;
   creating a predictive model based at least in part on the training data, the predictive model producing a probability, based at least in part on given transaction data associated with a given transaction, that human analysis of the given transaction data will result in freezing a second merchant account;
   receiving current transaction data for a current purchase transaction from a POS device associated with a third merchant account;
   generating a first probability, based at least in part on the current transaction data, that the current purchase transaction is fraudulent;
   determining that the first probability is greater than a first threshold;
   in response to determining that the first probability is greater than the first threshold, generating a second probability, based at least in part on the current transaction data and the predictive model, that human analysis of the current transaction data will result in freezing the third merchant account; and
   if the second probability is greater than a second threshold, freezing the third merchant account.

2. The method of claim 1, further comprising:
   if the second probability is not greater than the second threshold, initiating human analysis of the current transaction data to determine whether to freeze the third merchant account.

3. The method of claim 1, further comprising:
generating first probabilities corresponding respectively to the multiple purchase transactions based at least in part on the transaction data associated with the multiple purchase transactions;
identifying a set of the multiple purchase transactions having corresponding first probabilities that are less than the first threshold and greater than a third threshold;
selecting a subset of the set of multiple purchase transactions, wherein the subset is less than all of the multiple purchase transactions of the set;
generating second probabilities for the purchase transactions of the subset;
for each purchase transaction of the subset, comparing the second probability of the purchase transaction with the second threshold to determine whether to initiate human analysis of the purchase transaction.

4. The method of claim 1, further comprising:
generating second probabilities corresponding respectively to the multiple purchase transactions based at least in part on the predictive model and the transaction data of the multiple purchase transactions;
identifying a set of purchase transactions comprising less than all of the multiple purchase transactions having corresponding second probabilities that are greater than the second threshold; and
initiating human review of the purchase transactions of the set.

5. The method of claim 1, further comprising:
analyzing the transaction data to generate first probabilities that respective purchase transactions are fraudulent;
identifying a set of the multiple purchase transactions having corresponding first probabilities that are greater than a third threshold, wherein the third threshold is greater than the first threshold; and
freezing merchant accounts associated with the set of multiple purchase transactions.

6. A system, comprising:
one or more processors;
one or more non-transitory computer-readable media storing instructions executable by the one or more processors, wherein the instructions program the one or more processors to perform actions comprising:
  receiving transaction data associated with multiple purchase transactions, at least a portion of the transaction data being received from point-of-sale (POS) devices, the transaction data including first transaction data for a first purchase transaction;
  generating a first probability, based at least in part on the first transaction data, that the first purchase transaction is fraudulent;
  determining that the first probability is greater than a first threshold;
  in response to determining that the first probability is greater than the first threshold, generating a second probability, based at least in part on the first transaction data and a first predictive model, that human analysis of the first transaction data will result in freezing a first account associated with the first transaction; and
  if the second probability is greater than the second threshold, freezing the first account.

7. The system of claim 6, wherein generating the first probability is based at least in part on a second predictive model.

8. The system of claim 6, the actions further comprising:
if the second probability is not greater than the second threshold, initiating human analysis to determine whether to freeze the first account.

9. The system of claim 6, the actions further comprising:
compiling training data, the training data comprising (a) at least a portion of the received transaction data; and (b) an indication, for each historical purchase transaction of multiple historical purchase transactions, of whether a human analyst froze a corresponding account as a result of analyzing the transaction data corresponding to the historical purchase transaction; and
creating the first predictive model based at least in part on the training data, the first predictive model producing a probability, based at least in part on given transaction data associated with a given transaction, that human analysis of the given transaction data will result in freezing an account associated with the given transaction.

10. The system of claim 6, the actions further comprising:
generating first probabilities corresponding respectively to the multiple purchase transactions based at least in part on the transaction data associated with the multiple purchase transactions;
identifying a set of the multiple purchase transactions having corresponding first probabilities that are less than the first threshold and greater than a third threshold; and
selecting a subset of the set of multiple purchase transactions, wherein the subset is less than all of the multiple purchase transactions of the set;
generating second probabilities for the purchase transactions of the subset; and
for each purchase transaction of the subset, comparing the second probability of the purchase transaction with the second threshold to determine whether to initiate human analysis of the purchase transaction.

11. The system of claim 6, the actions further comprising:
generating second probabilities corresponding respectively to the purchase transactions based at least in part on the predictive model and the transaction data associated with the purchase transactions;
identifying a set of the purchase transactions having corresponding second probabilities that are less than the second threshold and greater than a third threshold; and
freezing merchant accounts associated with a subset of the set of purchase transactions, wherein the subset is less than all of the purchase transactions of the set.

12. The system of claim 6, the actions further comprising:
generating second probabilities corresponding respectively to the purchase transactions based at least in part on the predictive model and the transaction data associated with the purchase transactions;
identifying a set of purchase transactions comprising less than all of the multiple purchase transactions having corresponding second probabilities that are greater than the second threshold; and
initiating human review of the purchase transactions of the set.

13. The system of claim 6, the actions further comprising:
analyzing the transaction data to generate first probabilities that respective purchase transactions are fraudulent;
identifying a set of the multiple purchase transactions having corresponding first probabilities that are greater than a third threshold, wherein the third threshold is greater than the first threshold; and freezing accounts associated with the set of multiple purchase transactions.

14. A method comprising:

receiving transaction data associated with multiple purchase transactions, at least a portion of the transaction data being received from point-of-sale (POS) devices, the transaction data including first transaction data for a first purchase transaction;

generating a first probability, based at least in part on the first transaction data, that the first purchase transaction is fraudulent;

determining that the first probability is greater than a first threshold;

in response to determining that the first probability is greater than the first threshold, generating a second probability, based at least in part on the first transaction data and a first predictive model, that human analysis of the first transaction data will result in freezing a first account associated with the first transaction; and if the second probability is greater than the second threshold, freezing the first account.

15. The method of claim 14, wherein generating the first probability is based at least in part on a second predictive model.

16. The method of claim 14, further comprising:

if the second probability is not greater than the second threshold, initiating human analysis to determine whether to freeze the first account.

17. The method of claim 14, further comprising:

compiling training data, the training data comprising (a) at least a portion of the received transaction data; and (b) an indication, for each historical purchase transaction of multiple historical purchase transactions, of whether a human analyst froze a corresponding account as a result of analyzing the transaction data corresponding to the historical purchase transaction; and creating the first predictive model based at least in part on the training data, the first predictive model producing a probability, based at least in part on given transaction data associated with a given transaction, that human analysis of the given transaction data will result in freezing an account associated with the given transaction.

18. The method of claim 14, further comprising:

generating first probabilities corresponding respectively to the multiple purchase transactions based at least in part on the transaction data associated with the multiple purchase transactions;

identifying a set of the multiple purchase transactions having corresponding first probabilities that are less than the first threshold and greater than a third threshold; and selecting a subset of the set of multiple purchase transactions, wherein the subset is less than all of the multiple purchase transactions of the set;

generating second probabilities for the purchase transactions of the subset; and for each purchase transaction of the subset, comparing the second probability of the purchase transaction with the second threshold to determine whether to initiate human analysis of the purchase transaction.

19. The method of claim 14, further comprising:

generating second probabilities corresponding respectively to the purchase transactions based at least in part on the predictive model and the transaction data associated with the purchase transactions;

identifying a set of the purchase transactions having corresponding second probabilities that are less than the second threshold and greater than a third threshold; and freezing merchant accounts associated with a subset of the set of purchase transactions, wherein the subset is less than all of the purchase transactions of the set.

20. The method of claim 14, further comprising:

generating second probabilities corresponding respectively to the purchase transactions based at least in part on the predictive model and the transaction data associated with the purchase transactions;

identifying a set of purchase transactions comprising less than all of the multiple purchase transactions having corresponding second probabilities that are greater than the second threshold; and initiating human review of the purchase transactions of the set.

* * * * *